United States Patent
Schneider et al.

(10) Patent No.: US 7,348,384 B2
(45) Date of Patent: Mar. 25, 2008

(54) SUPPORTED, TITANIZED CHROMIUM CATALYST AND ITS USE FOR PREPARING HOMOPOLYMERS AND COPOLYMERS OF ETHYLENE

(75) Inventors: Martin Schneider, Ludwigshafen (DE); Rainer Karer, Kaiserslautern (DE); Dieter Lilge, Limburgerhof (DE); Volker Rauschenberger, Eisenberg (DE); Philipp Rosendorfer, Neustadt (DE); Joachim Wulff-Döring, Frankenthal (DE); Günther Schweier, Friedelsheim (DE); Martin Lux, Schwarzenbach (DE); Peter Bauer, Ludwigshafen (DE)

(73) Assignee: Basell Polyolefine GmbH, Wesseling (DE)

( * ) Notice: Subject to any disclaimer, the term of this patent is extended or adjusted under 35 U.S.C. 154(b) by 9 days.

(21) Appl. No.: 11/330,071

(22) Filed: Jan. 12, 2006

(65) Prior Publication Data

US 2006/0172884 A1 Aug. 3, 2006

Related U.S. Application Data

(62) Division of application No. 10/332,045, filed as application No. PCT/EP01/07410 on Jun. 28, 2001, now Pat. No. 7,019,089.

(30) Foreign Application Priority Data

Jul. 5, 2000 (DE) ................. 100 32 057

(51) Int. Cl.
*C08F 10/02* (2006.01)
*C08F 4/24* (2006.01)
*C08F 4/18* (2006.01)

(52) U.S. Cl. .............. 526/113; 502/113; 526/106; 526/352

(58) Field of Classification Search ............... 502/113; 526/113, 106, 352
See application file for complete search history.

(56) References Cited

U.S. PATENT DOCUMENTS

| 3,242,150 A | 3/1966 | Scoggin |
| 3,248,179 A | 4/1966 | Norwood |
| 3,798,202 A | 3/1974 | Nasser, Jr. |
| 4,284,527 A | 8/1981 | Pullukat et al. |
| 4,728,703 A | 3/1988 | Konrad et al. |
| 5,208,309 A | 5/1993 | Mc Daniel |
| 5,274,056 A | 12/1993 | Mc Daniel |
| 5,914,291 A | 6/1999 | Marsden |
| 6,649,709 B1 | 11/2003 | Bauer |

FOREIGN PATENT DOCUMENTS

| DE | 2118366 | 11/1972 |
| DE | 3635715 A1 | 5/1988 |
| DE | 3635715 C2 | 9/1988 |
| EP | 0 166 157 A2 | 1/1986 |
| EP | 0 591 968 A2 | 4/1994 |
| EP | 0640625 | 3/1995 |
| EP | 0 805 164 A1 | 11/1997 |
| EP | 0 857 737 A1 | 8/1998 |
| EP | 0 882 740 A1 | 12/1998 |
| EP | 0 882 741 A1 | 12/1998 |
| EP | 0 962 468 A1 | 12/1999 |
| WO | WO 92/17511 | 10/1992 |
| WO | WO 97/48742 | 12/1997 |
| WO | WO 97/48743 | 12/1997 |
| WO | WO 99/12982 | 3/1999 |
| WO | WO 99/29736 | 6/1999 |

OTHER PUBLICATIONS

Brunauer et al., Addorption of Gasses in Multimolecular Layers, J.Am. Chem.Soc. (1938), pp. 309-319, vol. LX.

*Primary Examiner*—Caixia Lu
(74) *Attorney, Agent, or Firm*—Novak Druce + Quigg LLP

(57) ABSTRACT

Novel supported, titanized chromium catalysts for the homopolymerization of ethylene and the copolymerization of ethylene with α-olefins, a process for preparing them and to their use for the polymerization of olefins.

7 Claims, No Drawings

SUPPORTED, TITANIZED CHROMIUM CATALYST AND ITS USE FOR PREPARING HOMOPOLYMERS AND COPOLYMERS OF ETHYLENE

This is a divisional of application Ser. No. 10/332,045 filed Jul. 24, 2003 (now U.S. Pat. No. 7,019,089), which is the national stage of international application PCT/EP01/07410, filed Jun. 28, 2001, the entire specification of which is hereby incorporated by references.

The present invention relates to novel supported, titanized chromium catalysts for the homopolymerization of ethylene and the copolymerization of ethylene with α-olefins, to a process for preparing them and to their use for the polymerization of olefins.

Homopolymers of ethylene and copolymers of ethylene with higher α-olefins such as 1-butene, 1-pentene, 1-hexene or 1-octene can be prepared using, for example, supported titanium compounds, viz. Ziegler-Natta catalysts, but also using supported chromium compounds, viz. Phillips catalysts. When the homopolymers and copolymers of ethylene are used, for example, for production of blown film, it is important that the polymers have a good balance between mechanical properties and processability.

It is known that supported chromium catalysts are very suitable for preparing copolymers of ethylene having good mechanical properties. The properties of the polymers obtained in the polymerization depend on the way in which the chromium catalyst used has been prepared, in particular on the type of support material, e.g. its chemical structure, makeup, surface area or pore volume, on the type of chromium compound used, on the presence of further compounds such as titanium compounds, aluminum alkyls or carbon monoxide, on the order of application of the various components or on the way in which calcination and activation are carried out. It is a combination of the starting materials used together with the specified manner of application to the support which then gives the desired chromium catalyst for the preparation of polymers which meet the requirements of the specific fields of use.

The supported chromium catalysts are often titanized, i.e. they further comprise, in addition to the chromium compound, variable proportions of a titanium compound by means of which, for example, the molar mass distribution and the HLMI (high load melt index) can be influenced.

Thus, for example, EP-A-882740 describes a process for preparing a supported chromium catalyst, where the support material has a specific surface area of from 450 to 600 $m^2/g$ and firstly the chromium component and subsequently the titanium component are applied to the support material, and titanization is carried out at not less than 300° C.

EP-A-882741 teaches that polyethylenes having favorable ultimate tensile strengths are obtained when using a supported chromium catalyst whose support material has a specific surface area of at least 400 $m^2/g$ and has been dehydrated before use. This catalyst is prepared by applying firstly the chromium component and then the titanium compound to the support.

WO 97/48742 describes polymerization catalysts comprising silica gels having a particle size of from 5 to 250 µm, a specific surface area of from 10 to 1000 $m^2/g$ and an AQI (attrition quality index, as a measure of the abrasion resistance) of greater than 10, where the primary particles are loosely bound to one another by means of a binder. Active metal components used can be, inter alia, chromium compounds. However, no information on the preparation of titanized Phillips catalysts is given.

Although quite good mechanical properties of the polymers prepared in this way can be obtained by means of many of the formulation/component combinations, problems with parison stability in blown film production are often observed.

It is an object of the present invention to provide novel ethylene polymers which have good mechanical properties and display good parison stability when used in blown film production.

We have found that this object is achieved by a process for preparing supported, titanized chromium catalysts, which comprises the following steps:

A) bringing a spherical, spray-dried, oxidic support material into contact with a titanium compound in a suspension,
B) bringing the support material which has been treated in this way into contact with a chromium salt solution in a suspension and subsequently removing the solvent,
C) if desired, calcining the precatalyst obtained in step B) at above 280° C. in an inert gas atmosphere and subsequently
D) activating the precatalyst obtained in step B) or C) at from 500° C. to 800° C. in an oxygen-containing atmosphere.

The invention further provides novel supported, titanized chromium catalysts which are suitable for the polymerization of ethylene and, if desired, further comonomers and are obtainable by the process of the present invention. This novel supported, titanized chromium catalyst for the homopolymerization of ethylene and the copolymerization of ethylene with α-olefins will hereinafter, in the interests of brevity, be referred to as "chromium catalyst of the present invention".

Accordingly, it has been found that use of the chromium catalysts of the present invention makes it possible to obtain homopolymers and especially copolymers of ethylene which have particularly good mechanical properties and at the same time display high parison stability. In addition, the film products obtained display a very low level of specks.

In view of the prior art, it was not to be expected that this measure would make it possible to achieve the stated objectives of good mechanical properties together with high parison stability of the films comprising the ethylene homopolymers and copolymers of the present invention.

The invention also provides a process for preparing homopolymers of ethylene and copolymers of ethylene with α-olefins by polymerization of ethylene or mixtures of ethylene and α-olefins using at least one chromium catalyst of the present invention, provides the homopolymers and copolymers of ethylene obtainable therefrom and provides for their use for producing films.

An essential constituent of the chromium catalyst of the present invention is the spherical, spray-dried, oxidic support material.

The spherical, spray-dried, oxidic support material, hereinafter referred to in the interests of simplicity as support material, is usually a porous, inorganic solid which may contain hydroxyl groups. Examples of such solids, which are known to those skilled in the art, are aluminum oxide, silicon dioxide (silica gel), titanium dioxide or mixed oxides thereof, or aluminum phosphate. Further suitable support materials can be obtained by modifying the pore surface with, for example, compounds of the elements boron (BE-A-61,275), aluminum (U.S. Pat. No. 4,284,527), silicon (EP-A 0 166 157) or phosphorus (DE-A 36 35 715). Preference is given to using a silica gel.

The preferred support material is produced, for example, by spray drying milled, appropriately sieved hydrogels which for this purpose are mixed with water or an aliphatic alcohol. The primary particles are porous, granular particles of the appropriately milled and sieved hydrogel having a mean particle diameter of from 1 to 20 µm, preferably from 1 to 5 µm. Preference is given to using milled and sieved $SiO_2$ hydrogels.

In general, the mean particle size of the support particles is in the range from 10 to 1000 µm, preferably in the range from 20 to 120 µm and particularly preferably in the range from 30 to 100 µM.

The pore volume of the support material used is in the range from 0.5 to 3 ml/g, preferably from 1 to 2 ml/g and particularly preferably from 1 to 1.6 ml/g.

Furthermore, it is advantageous according to the present invention for the support particles to have a specific surface area of from 50 to 600 $m^2/g$. If support particles having a lower specific surface area are used, the catalytic activity of the chromium catalysts concerned is generally reduced. On the other hand, chromium catalysts based on support gel particles having a specific surface area of >600 $m^2/g$ usually have a comparatively low abrasion resistance. Preference is given to support gel particles having a specific surface area of from 300 to 600 $m^2/g$, particularly preferably from 300 to 550 $m^2/g$.

The specific surface area and the mean pore volume are determined by nitrogen adsorption using the BET method as described, for example, by S. Brunauer, P. Emmett and E. Teller in Journal of the American Chemical Society, 60, (1939), pages 209-319.

In addition, the support particles used according to the present invention have a mean pore diameter of from 80 to 250 Å, preferably from 90 to 210 Å and particularly preferably from 95 to 200 Å. The mean pore diameter in Å is calculated by dividing the numerical value of the mean pore volume (in $cm^3/g$) by the numerical value of the specific area (in $m^2/g$) and multiplying this figure by 40,000.

The production and properties of suitable support materials is described, for example, in WO 97/48743 and the documents cited therein. Suitable support materials are also commercially available.

Before use in the process of the present invention, the support material can also be partially or fully modified. The support material can, for example, be treated at from 200 to 1000° C. under oxidizing or nonoxidizing conditions, if desired in the presence of fluorinating agents, for example ammonium hexafluorosilicate. In this way, it is possible, inter alia, to vary the water and/or OH content. The support material is preferably dried at from 100 to 200° C. under reduced pressure for from 1 to 10 hours before use in the process of the present invention.

In step A), the support material is brought into contact with a titanium compound in a suspension. As titanium compound, preference is given to using a tetravalent compound of the formula $(RO)_nX_{4-n}Ti$, where the radicals R are identical or different and are each an organosilicon or carboorganic substituent having from 1 to 20 carbon atoms, e.g. a linear, branched or cyclic $C_1$-$C_{20}$-alkyl such as methyl, ethyl, n-propyl, isopropyl, n-butyl, sec-butyl, isobutyl, tert-butyl, n-pentyl, sec-pentyl, isopentyl, n-hexyl, cyclohexyl, n-heptyl and n-octyl, a $C_6$-$C_{18}$-aryl such as phenyl, 1-naphthyl, 2-naphthyl, 1-anthryl, 2-anthryl, 9-anthryl and 1-phenanthryl or a trialkylsilyl such as trimethylsilyl or triethylsilyl. R is preferably a linear or branched $C_1$-$C_6$-alkyl such as methyl, ethyl, n-propyl, isopropyl, n-butyl, sec-butyl, isobutyl, tert-butyl, n-pentyl or n-hexyl. Possible radicals X are halogens such as fluorine, chlorine, bromine or iodine, preferably chlorine. n is from 0 to 4, preferably 4.

The titanium compound is preferably soluble in the suspension medium, for which reason preference is given to using titanium tetraalkoxides since they have good solubilities in a great number of solvents. Suitable suspension media are, in particular, $C_4$-$C_8$-alkanes such as isobutane, isopentane, n-pentane, n-hexane, n-heptane or n-octane.

It is usual to slurry the support material with the suspension medium and then to add the titanium compound. However, it is also possible, for example, to dissolve the titanium compound in the suspension medium and subsequently to add this to the support material. The support material is preferably slurried with the suspension medium and, if desired, an acid, preferably a $C_1$-$C_6$-carboxylic acid such as formic acid or acetic acid, particularly preferably formic acid, for from 10 to 120 minutes before addition of the titanium compound.

In general, the loading of the support material is carried out in a weight ratio of support gel particles:Ti of from 100:0.1 to 100:12, in particular from 100:1 to 100:6.

Reaction step A) can be carried out at from 0 to 100° C. For cost reasons, room temperature is preferred. Before the subsequent step B), all or some of the solvent and/or the acid can be distilled off. The titanized support from step A) is preferably isolated and largely freed of the suspension medium and acid before being reacted further.

In reaction step B), the intermediate obtained from A) is brought into contact with a chromium salt solution in a suspension and the solvent is subsequently removed.

Examples of suitable chromium compounds are chromium trioxide and chromium hydroxide and also salts of trivalent chromium with organic and inorganic acids, e.g. chromium acetate, chromium oxalate, chromium sulfate and chromium nitrate, and chelates of trivalent chromium, e.g. chromium acetylacetonate. Among these, very particular preference is given to using chromium(III) nitrate nonahydrate and chromium acetylacetonate.

The intermediate obtained from A) is preferably brought into contact with the chromium compound in water or methanol. Here, the chromium component is preferably dissolved in water or methanol and subsequently mixed with the intermediate from A). The reaction time is from 10 minutes to 5 hours.

In general, the loading of the intermediate is carried out in a weight ratio of support gel particles:chromium of from 100:0.1 to 100:10, in particular from 100:0.3 to 100:3.

The solvent is subsequently removed, preferably at from 20 to 150° C. and pressures of from 10 mbar to 1 mbar. The precatalyst obtained in this way can be completely dry or can have a certain residual moisture content. However, the volatile constituents should make up no more than 20% by weight, in particular no more than 10% by weight, of the still not activated chromium-containing precatalyst.

The precatalyst obtained from reaction step B) can be subjected immediately to step D) or else can be calcined beforehand in a water-free inert gas atmosphere at above 280° C. in step C). The calcination is preferably carried out at from 280 to 800° C. in a fluidized bed of from 10 to 1000 minutes.

The intermediate obtained in this way from step B) or C) is then activated under oxidizing conditions in step D), for example in an oxygen-containing atmosphere at from 400 to 1000° C. The intermediate obtained from step B) or C) is preferably activated directly in the fluidized bed by replacing the inert gas by an oxygen-containing gas and increasing the temperature to the activation temperature. The intermediate is advantageously heated at from 400 to 1000° C., in particular from 500 to 800° C., in a water-free gas stream containing more than 10% by volume of oxygen for from 10 to 1000 minutes, in particular from 150 to 750 minutes, and then cooled to room temperature, resulting in the Phillips catalyst to be used according to the present invention. The maximum temperature of the activation is below, preferably at least 20-100° C. below, the sintering temperature of the intermediate from step B) or C). This oxidation can also be carried out in the presence of suitable fluorinating agents, for example ammonium hexafluorosilicate.

The chromium catalyst of the present invention advantageously has a chromium content of from 0.1 to 5% by weight, in particular from 0.3 to 2% by weight, and a titanium content of from 0.5 to 10% by weight, in particular from 1 to 5% by weight.

The catalyst systems of the present invention display a short induction time in the polymerization of 1-alkenes.

The resulting chromium catalyst to be used according to the present invention can also be reduced in suspension or in the gas phase, for example by means of ethylene and/or α-olefins, carbon monoxide or triethylborane, before use or it can be modified by silylation. The molar ratio of reducing agent to chromium (of the chromium catalyst of the present invention to be reduced) is usually in the range from 0.05:1 to 500:1, preferably from 0.1:1 to 50:1, in particular from 0.5:1 to 5.0:1.

In suspension, the reduction temperature is generally in the range from 10 to 200° C., preferably in the range from 10 to 100° C., and the pressure is in the range from 0.1 to 500 bar, preferably in the range from 1 to 200 bar.

The reduction temperature in the fluidized-bed method is usually in the range from 10 to 1000° C., preferably from 10 to 800° C., in particular from 10 to 600° C. The gas-phase reduction is generally carried out in a pressure range from 0.1 to 500 bar, preferably in the range from 1 to 100 bar and in particular in the range from 5 to 20 bar.

In the gas-phase reduction, the chromium catalyst to be reduced is generally fluidized in a fluidized-bed reactor by means of an inert carrier gas stream, for example nitrogen or argon. The carrier gas stream is usually laden with the reducing agent, in which case reducing agents which are liquid under normal conditions preferably have a vapor pressure of at least 1 mbar.

The chromium catalyst of the present invention is very well suited to the preparation of homopolymers of ethylene and copolymers of ethylene with α-olefins at from 20 to 300° C. and pressures of from 5 to 400 bar in the customary processes known for the polymerization of olefins, for example, solution processes, suspension processes in a stirring autoclave or loop reactor, stirred gas phase or gas-phase fluidized-bed processes, which can be carried out continuously or batchwise. The advantageous pressure and temperature ranges for carrying out the process therefore depend greatly on the polymerization method.

In particular, temperatures of from 50 to 150° C., preferably from 70 to 120° C., and pressures generally in the range from 1 to 400 bar are employed in these polymerization processes. As solvents or suspension media, it is possible to use inert hydrocarbons such as isobutane or else the monomers themselves, for example higher olefins such as propene, butene or hexene in the liquefied or liquid state. The solids content of the suspension is generally in the range from 10 to 80% by weight. The polymerization can be carried out either batchwise, e.g. in stirring autoclaves, or continuously, e.g. in tube reactors, preferably in loop reactors. In particular, the Phillips PF process as described in U.S. Pat. No. 3,242,150 and U.S. Pat. No. 3,248,179 can be employed.

Among the abovementioned polymerization processes, gas-phase polymerization, particularly in gas-phase fluidized-bed reactors, is preferred according to the present invention. It has been found that despite the various processing steps and the spray-dried support materials, no fine dust is formed during gas-phase polymerization. In general, the gas-phase polymerization is carried out at a temperature which is at least a few degrees below the softening temperature of the polymer. The gas-phase polymerization can also be carried out in the condensed, supercondensed or supercritical mode.

If desired, different or like polymerization processes can also be connected in series so as to form a polymerization cascade. However, the particular catalyst composition makes it possible to obtain the polymers of the present invention easily from a single reactor.

Examples of suitable α-olefins which can be copolymerized with ethylene are monoolefins and diolefins having from three to 15 carbon atoms in the molecule. Well suited α-olefins of this type are propene, 1-butene, 1-pentene, 1-hexene, 1-octene, 1-decene, 1-dodecene and 1-pentadecene and also the conjugated and nonconjugated diolefins butadiene, 1,3-pentadiene, 2,3-dimethylbutadiene, 1,4-pentadiene, 1,5-hexadiene and vinylcyclohexene. It is possible to use mixtures of these comonomers. Preference is given to using 1-butene, 1-hexene or 1-octene, in particular 1-hexene.

To control the molar mass, it is advantageous to add hydrogen as regulator in the polymerization.

It has been found to be advantageous to carry out the polymerization of the 1-alkenes using the catalysts of the present invention in the presence of organometallic compounds of the first, second, third or fourth main group or of the second transition group of the Periodic Table of the Elements. Useful compounds of this type are homoleptic $C_1$-$C_{10}$-alkyls of lithium, boron, aluminum or zinc, e.g. n-butyllithium, triethylborane, trimethylaluminum, triethylaluminum, triisobutylaluminum, tributylaluminum, trihexylaluminum, trioctylaluminum and diethylzinc. $C_1$-$C_{10}$-Dialkylaluminum alkoxides such as diethylaluminum ethoxide are also well suited. It is also possible to use dimethylaluminum chloride, methylaluminum dichloride, methylaluminum sesquichloride or diethylaluminum chloride. Particular preference is given to n-butyllithium as organometallic compound. Mixtures of the above-described organometallic compounds are generally also useful, with the mixing ratio not being critical.

The molar ratio of organometallic compound:chromium is usually in the range from 0.1:1 to 50:1, preferably in the range from 1:1 to 50:1. However, since many of the activators, e.g. aluminum alkyls, are also used at the same time for removing catalyst poisons (used as scavengers), the amount used depends on the level of impurities in the other starting materials. However, the optimum amount can easily be determined by a person skilled in the art by means of simple tests.

The chromium catalysts of the present invention can also be used in the above polymerization processes together with another catalyst suitable for the polymerization of α-olefins. The chromium catalyst of the present invention is preferably used together with another supported chromium catalyst customary for the polymerization of α-olefins. The use of two different supported chromium catalysts is described, for example, in WO 92/17511. Two or more of the chromium catalysts of the present invention can also be used simultaneously in the polymerization. The polymerization is particularly preferably carried out using a chromium catalyst of the present invention together with a supported, nontitanized chromium catalyst which can be prepared by a process in which a spherical, spray-dried support material is treated according to the above-described steps B) to D). The preferred embodiments of this nontitanized, supported chromium catalyst are usually analogous to those for the titanized chromium catalyst of the present invention. The activation of the two catalysts can be carried out separately or jointly. The ratio of nontitanized to titanized chromium catalyst is in the range from 3:1 to 1:3, preferably from 2:1 to 1:3 and particularly preferably from 1:1 to 1:2. Preference is given to firstly mixing the two catalysts and then activating them jointly. This combination gives particularly advantageous film products displaying good parison stabilities and good mechanical properties. Mixtures of titanized and nontitanized supported chromium catalysts are described, for example, in U.S. Pat. No. 3,798,202, but here the titanization is carried out only after the chromium component has been applied to a support. Such an order does not display the advantages according to the present invention for the present support materials.

The two different Phillips catalysts, namely the titanized chromium catalyst and the nontitanized chromium catalyst, can, before they come into contact with the monomer, be mixed and then introduced into the reactor together, or they can be metered into the reactor separately, for example at a plurality of points.

The homopolymers and copolymers of ethylene obtained according to the present invention usually have a density, measured in accordance with DIN 53479, in the range from 0.9 to 0.97 g/cm$^3$, preferably in the range from 0.92 to 0.96 g/cm$^3$ and particularly preferably in the range from 0.925 to 0.945 g/cm$^3$ and a melt flow index MFI (190° C./2.16 kg) in the range from 0 to 10 g/10 min, preferably in the range from 0.01 to 1 g/10 min and particularly preferably in the range from 0.05 to 0.6 g/10 min, and a high load melt index HLMI (190° C./21.6 kg) in the range from 1 to 50 g/10 min, preferably in the range from 3 to 30 g/10 min and particularly preferably in the range from 5 to 25 g/10 min, in each case measured in accordance with DIN 53735 under different loads (in brackets).

The weight average molar mass $M_w$ is generally in the range from 10,000 to 7,000,000 g/mol, preferably in the range from 100,000 to 500,000 g/mol. The molar mass distribution $M_w/M_n$, measured by the GPC (gel permeation chromatography) method at 135° C. in 1,2,4-trichlorobenzene against a polyethylene standard, is usually in the range from 3 to 50, preferably in the range from 8 to 30 and particularly preferably in the range from 15 to 30.

In general, the ethylene polymers produced in the reactor are melted and homogenized in an extruder. The melt flow index and the density of the extrudate can then be different from the corresponding parameters of the crude polymer, but continue to lie in the range according to the present invention.

The olefin polymerization in which the catalyst prepared according to the present invention is used can be employed to prepare homopolymers of ethylene or copolymers of ethylene with up to 10% by weight of a comonomer having from 3 to 12 carbon atoms. Preferred copolymers contain from 0.3 to 1.5 mol % of hexene, based on the polymer, and particularly preferably from 0.5 to 1 mol % of hexene.

The ethylene copolymer of the present invention can also form mixtures with other olefin polymers, in particular homopolymers and copolymers of ethylene. These mixtures can, on the one hand, be prepared by the above-described simultaneous polymerization using a plurality of chromium catalysts. On the other hand, these mixtures can also be obtained simply by subsequent blending of the polymers of the present invention with other homopolymers or copolymers of ethylene. Preference is given to mixtures of which one part can be prepared by polymerization using a chromium catalyst according to the present invention and the second part can be prepared by polymerization using a supported, nontitanized chromium catalyst which can be prepared by a process comprising the steps B) to D). MFI, HLMI, density, comonomer content, $M_w$ and $M_w/M_n$ of these mixtures are preferably likewise in the range of the polymers which are prepared using only one of the titanium-containing chromium catalysts of the present invention.

The ethylene copolymers, polymer mixtures and blends can also further comprise auxiliaries and/or additives known per se, for example processing stabilizers, stabilizers against the action of light and heat, customary additives such as lubricants, antioxidants, antiblocking agents and antistatics, and also possibly colorants. A person skilled in the art will be familiar with the types and amounts of these additives.

The polymers of the present invention can also be modified afterwards by grafting, crosslinking, hydrogenation, functionalization or other modification reactions known to those skilled in the art.

The polymers of the present invention are very suitable for, for example, producing films on blown film plants at high outputs. Films comprising the polymers of the present invention have good mechanical properties. Also notable is the high parison stability in production of blown films.

The films obtained in this way are particularly suitable for the packaging sector and for heavy duty sacks and also for the food sector. Furthermore, the films display only a low tendency to blocking and can therefore be handled by machine even without or with only small additions of lubricants and antiblocking agents.

The Phillips catalyst of the present invention has particular unexpected advantages. It is very suitable for the homopolymerization and copolymerization of ethylene by the customary and known particle form process in a gas-phase fluidized-bed polymerization. Here, it gives, with high productivity, (co)polymers of excellent morphology and good processability having melt flow indices of from 0 to 1 g/10 min, high load melt flow indices of from 1 to 50 g/10 min and melt flow ratios (HLMI/MI) of from 50 to 200. These (co)polymers display only very slight swelling on leaving the extruder die in blown film production. The (co)polymers prepared by means of the Phillips catalyst of the present invention are therefore particularly suitable for blown film production and blow molding.

The following examples illustrate the invention.

The productivity of the catalyst P/C refers to the amount of polymer isolated per amount of Phillips catalyst used in g.

The comonomer content of the ethylene/1-alkene copolymers (% $C_6$), their methyl side chain content per 1000 carbon atoms of the polymer chain ($CH_3$/1000) and their density were determined by IR spectroscopy.

The eta value was determined by means of an automatic Ubbelohde viscometer (Lauda PVS 1) using decalin as solvent at 130° C. (ISO 1628 at 130° C., 0.001 g/ml of decalin).

The determination of the molar mass distributions and the means $M_n$, $M_w$ and $M_w/M_n$ derived therefrom was carried out by means of high-temperature gel permeation chromatography using a method based on DIN 55672, under the following conditions: solvent: 1,2,4-trichlorobenzene, flow: 1 ml/min, temperature: 135° C., calibration using PE standards.

The Dyna value was determined in accordance with DIN 53373.

The HLMI was determined in accordance with ISO 1133.

The dart drop value was determined in accordance with ASTM D12709/A.

The density was determined in accordance with ISO 1183.

Abbreviations used in the following tables:
T Temperature during the polymerization
$M_w$ weight average molar mass
$M_n$ Number average molar mass
$Et_a$ Viscosity
Density Polymer density Mw Weight average molar mass [sic]
HLMI Melt flow index at 190° C. and 21.6 kg
MI Melt flow index at 190° C. and 21.16 kg
% $C_6$ Comonomer content of the polymer

EXAMPLES AND COMPARATIVE EXPERIMENTS

Example 1

Preparation of a Catalyst According to the Present Invention

The support used was a spray-dried silica gel having a BET surface area of 520 m²/g and a pore volume of 1.26 ml/g.

Such support materials are commercially available from, for example, Grace under the trade name Sylopol® 2101.

15 kg of the silica gel were dried at 130° C. under reduced pressure (<10 mbar) for 7 h. After cooling, a solution of 0.5 l of formic acid in 40 l of heptane was added and the mixture was stirred for 30 minutes. 3.9 l of titanium tetraisopropoxide were subsequently added while stirring. After one hour, the solvent was distilled off. The (titanized) support was subsequently admixed with a solution of 600 g of chromium nitrate $(Cr(NO_3)_3 \cdot 9H_2O)$ in 20 l of ethanol, the mixture was stirred for one hour and the solvent as then distilled off. The precatalyst obtained in this way contained 0.5% by weight of chromium and 3.6% by weight of titanium.

The precatalyst was activated in a gas-phase fluidized bed. In this activation procedure, it was heated to the desired final temperature of 650° C. while being fluidized by means of air. The final temperature was held for 10 hours, the gas was subsequently changed back to nitrogen and the catalyst was cooled.

Examples 2 and 3

Gas-phase Polymerization

The polymerization was carried out in a fluidized-bed reactor having a diameter of 0.5 m. The reactor temperature is indicated in Table 1 and the pressure in the reactor was 21 bar. The reactor gas had the following composition: 56% by volume of ethene, 2% by volume of hexane and the % by volume of 1-hexene indicated in Table 1. The nitrogen content (in % by volume) can thus be calculated simply as 42 minus the amount of hexene (in % by volume) indicated in Table 1. The catalyst used was that obtained as described in Example 1.

TABLE 1

| Ex. | $C_6^2$ [% by volume] | T [° C.] | Activity [g PE/g cat] | HLMI [g/10 min] | Eta [dl/g] | Density [g/cm³] | $M_w$ [g/mol] | $M_w/M_n$ |
|---|---|---|---|---|---|---|---|---|
| 2 | 0.77 | 106 | 5871 | 12.5 | 3.4 | 0.9319 | 335247 | 23.6 |
| 3 | 0.77 | 105.3 | 5767 | 10.0 | 3.0 | 0.9325 | 282470 | 23.6 |

[1]All data or polymer properties are based on the polymer obtained directly from the polymerization
[2]% by volume of hexene in the reactor

Comparative Example C1

The support used was the granular silica gel Sylopol® 332 from Grace having a BET surface area of 325 m²/g and a pore volume of 1.79 ml/g. 18 kg of the silica gel were admixed with a solution of 280 g of chromium nitrate in 30 l of methanol and the solvent was distilled off. The precatalyst obtained in this way contains 0.2% by weight of chromium.

This precatalyst was calcined in a gas-phase fluidized bed. In this calcination, the fluidized bed was heated to the final temperature of 700° C., this temperature was held for 10 hours, the gas was subsequently changed back to nitrogen and the catalyst was cooled. The polymerization was carried out in the gas phase by a method analogous to Examples 2 and 3 using 0.32% by volume of hexene at 110° C.

Comparative Example C2

As precatalyst, use was made of the commercially available catalyst EP 350 HiTi (Grace), namely a granular silica gel containing 1% by weight of chromium and 3% by weight of titanium and having a BET surface area of 502 m²/g and a pore volume of 1.95 ml/g.

The precatalyst was calcined in a gas-phase fluidized bed. In this calcination, the fluidized bed was heated to the final temperature of 575° C., this temperature was held for 10 hours, the gas was subsequently changed back to nitrogen and the catalyst was cooled. The polymerization was carried out in the gas phase by a method analogous to Examples 2 and 3 using 0.32% by volume of hexene at 109° C.

Comparative Example C3

The support used was the spray-dried silica gel from Example 1 having a BET surface area of 520 m²/g and a pore volume of 1.26 ml/g. 18 kg of the silica gel were admixed with a solution of 420 g of chromium nitrate in 23 l of methanol and the solvent was distilled off. The precatalyst obtained in this way contained 0.3% by weight of chromium.

The precatalyst was calcined in a gas-phase fluidized bed. In this calcination, the fluidized bed was heated to the final temperature of 750° C., this temperature was held for 2 hours, the gas was subsequently changed back to nitrogen and the catalyst was cooled. The polymerization was carried out in the gas phase by a method analogous to Examples 2 and 3 using 0.33% by volume of hexene at 107.4° C.

Comparative Example C4

The precatalyst was prepared by a method analogous to Comparative Example C3.

The precatalyst was calcined in a gas-phase fluidized bed. In this calcination, the fluidized bed was heated to the final temperature of 750° C., this temperature was held for 10 hours, the gas was subsequently changed back to nitrogen and the catalyst was cooled. The polymerization was carried out in the gas phase by a method analogous to Examples 2 and 3 using 0.39% by volume of hexene at 107.5° C.

Comparative Example C5

The support used was a spray-dried silica gel having a BET surface area of 310 m²/g and a pore volume of 1.54 ml/g. 18 kg of the silica gel were admixed with a solution of 720 g of chromium nitrate in 23 l of methanol and the solvent was distilled off. A solution of 3.5 l of titanium isopropoxide in 20 l of heptane were subsequently added while stirring. After one hour, the solvent was distilled off. The precatalyst obtained in this way contained 0.5% by weight of chromium and 3% by weight of titanium.

The precatalyst was calcined in a gas-phase fluidized bed. In this calcination, the fluidized bed was heated to the final temperature of 750° C., this temperature was held for 2 hours, the gas was subsequently changed back to nitrogen and the catalyst was cooled. The polymerization was carried out in the gas phase by a method analogous to Examples 2 and 3 using 0.9% by volume of hexene at 105.8° C. The catalyst led to lumps and deposits in the reactor during the polymerization.

Example 4

Preparation of a Catalyst According to the Present Invention

The support used was a spray-dried silica gel (see C5) having a BET surface area of 310 m²/g and a pore volume of 1.54 ml/g.

18 kg of the silica gel were dried at 130° C. under reduced pressure (<10 mbar) for 7 h. After cooling, a solution of 3.5 l of titanium isopropoxide in 20 l of heptane was added. After one hour, the solvent was distilled off. The (titanized) support was subsequently admixed with a solution of 720 g of chromium nitrate $(Cr(NO_3)_3 \cdot 9H_2O)$ in 23 l of methanol, the mixture was stirred for one hour and the solvent was then distilled off. The precatalyst obtained in this way contained 0.5% by weight of chromium and 3% by weight of titanium.

The precatalyst was calcined in a gas-phase fluidized bed. In this calcination, the fluidized bed was heated to the final temperature of 750° C., this temperature was held for 2 hours, the gas was subsequently changed back to nitrogen and the catalyst was cooled. The polymerization was carried out in the gas phase by a method analogous to Examples 2 and 3 using 0.9% by volume of hexene at 105.7° C. The catalyst did not lead to lumps and deposits in the reactor during the polymerization.

Film Production

Comparative Examples C1 to C4, C6 and Example 2

For comparison, granulated PE powders which had been prepared using the catalysts of the present invention and those not according to the present invention were processed to produce films. The ethylene copolymers from Examples 2 and C1 to C4 were used. In addition, a commercial product (Finathene HF513=Comparative Example C6) was processed in the same way. Table 2 below gives an overview of the properties of the granulated PE products.

Granulation was carried out on a ZSK 40 extruder (Werner & Pfleiderer). As stabilizers, 500 ppm of Irganox® 1076 and 1000 ppm of Irgaphos® 168 (Ciba) were added to the PE batches. The temperature of the PE melt (melt temperature) was 200° C. at a throughput of 100 kg/h.

Film production was carried out on a film blowing machine from Windmöller and Hölscher using the following settings: die diameter: 100 mm, die gap: 1.2 mm, melt temperature: 225° C., a melt pressure corresponding to Table 2, blow ratio: 1:4, neck length: 900 mm, film thickness: 20 μm. The polymer throughput was 50 kg/h.

The polymers of the present invention produce a low melt pressure buildup at the extrusion die of the film blowing machine, display very good parison stability and the films have a significantly reduced level of specks.

In film production using the polymer from Example 2, a film having a thickness of 5 μm could be produced without pumping of the parison at a blow ratio of 1:5 and an offtake speed of 110 m/s.

TABLE 2

| Ex. | HLMI [g/10 min] | Eta [dl/g] | Density [g/cm³] | % C6² [% by weight] | $M_w$ [g/mol] | $M_w/M_n$ |
|---|---|---|---|---|---|---|
| 2 | 17.5 | 2.83 | 0.9328 | 4.5 | 265782 | 23.8 |
| C1 | 14.0 | 3.3 | 0.9341 | 3.5 | 245154 | 10.9 |
| C2 | 15.4 | 3.62 | 0.9364 | 2.9 | 294577 | 19.4 |
| C3 | 13.9 | 3.21 | 0.9343 | 3.1 | 266769 | 11.4 |
| C4 | 16.6 | 2.83 | 0.9338 | 2.9 | 300726 | 17.1 |
| C6 | 14.5 | 2.9 | 0.9337 | 4.4 | 317716 | 20 |

| | | Speck topogr. | | | |
|---|---|---|---|---|---|
| Ex. | Melt pressure | 20-50 μm | 50-100 μm | 100-200 μm | Dart drop impact [g] | Dyna [Nm/mm] |
| 2 | 344 | 9 | 0 | 0 | 167 | 10.1 |
| C1 | 377 | 86 | 9 | 0 | 144 | 7.7 |
| C2 | 376 | 8 | 2 | 1 | 155 | 9.8 |
| C3 | 409 | 3 | 0 | 0 | 200 | 11.9 |
| C4 | 350 | 36 | 3 | 0 | 160 | 10.1 |
| C6 | 370 | 59 | 7 | 0 | 200 | 12 |

¹All polymer property data are based on the granulated polymer
²$C_6$ = 1-hexene incorporated into the polymer
³Specks per m² of film, the sizes of which were determined microscopically Example 5

Example 4 was repeated using 3.47 l of titanium tetraisopropoxide in 28 l of heptane and 1 443 g of chromium nitrate $(Cr(NO_3)_3 \cdot 9H_2O)$ in 25 l of methanol. The precatalyst obtained in this way contained 1% by weight of Cr and 3% by weight of Ti.

The calcination was likewise carried out by a method analogous to Example 4, but at 580° C.

The polymerization was carried out in the gas phase in a manner analogous to Examples 2 and 3 using 0.7% by volume of hexene at 107° C. This gave a polymer having a density of 0.936 g/cm³ (3.8% by weight of C6 in the polymer), an HLMI of 15.7 g/10 min, an eta value of 2.63 dl/g, an $M_w$ of 238 732 g/mol, an $M_w/M_n$ of 22.03, from which a film was produced in a manner corresponding to the previous examples. The melt pressure during extrusion was 328. The film had a Dyna value of 8 Nm/mm and a dart drop impact strength of 160 g.

Example 6

Example 4 was repeated, but only 720 g of chromium nitrate ($Cr(NO_3)_3 \cdot 9H_2O$) in 25 l of methanol were used and no titanium tetraisoproproxide was added. The precatalyst obtained in this way contained 0.5% by weight of Cr.

This catalyst was mixed in a ratio of 1:1 with the catalyst from Example 5. The calcination of the mixture obtained in this way was likewise carried out by a method analogous to Example 4, but at 550° C.

The polymerization was carried out in the gas phase in a manner analogous to Examples 2 and 3 using 0.98% by volume of hexene at 105.4° C. This gave a polymer having a density of 0.9324 g/cm$^3$ (4.9% by weight of C6 in the polymer), an HLMI of 9.2 g/10 min, an eta value of 3.06 dl/g, an $M_w$ of 324 844 g/mol, an $M_w/M_n$ of 26.45, from which a film was produced in a manner corresponding to the previous examples. The melt pressure during extrusion was 386. The film had a Dyna value of 12.4 Nm/mm and a dart drop impact of 197 g.

We claim:

1. A supported, titanized chromium catalyst obtained by a process which comprises the following steps:
    A) bringing a spherical, spray-dried, oxidic support material into contact with a titanium compound in a suspension,
    B) bringing the support material which has been treated in this way into contact with a chromium salt solution in a suspension and subsequently removing the solvent,
    C) optionally, calcining the precatalyst obtained in step B) at above 280° C. in an inert gas atmosphere and subsequently
    D) activating the precatalyst obtained in step B) or C) at from 500° C. to 800° C. in an oxygen-containing atmosphere.

2. The supported, titanized chromium catalyst of claim 1 having a chromium content of from 0.1 to 5% by weight and a titanium content of from 0.5 to 10% by weight.

3. The catalyst of claim 1, wherein the oxidic support material is a silica gel.

4. The catalyst of claim 1, wherein the pore volume of the support material is from 0.5 to 3 ml/g.

5. The catalyst of claim 1, wherein the specific surface area of the support material is from 50 to 600 m$^2$/g.

6. The catalyst of claim 1, wherein the mean particle size of the support material is from 1 to 1000 µm.

7. The catalyst of claim 1, wherein the support material is slurried with an acid before being brought into contact with the titanium compound.

* * * * *